Oct. 22, 1957 J. PERKS ET AL 2,810,334
ROOF VENTILATORS FOR MOTOR COACHES AND LIKE VEHICLES
Filed Nov. 16, 1954 6 Sheets-Sheet 1

INVENTORS
JOSEPH PERKS
WILLIAM HENRY BISHOP
by Walter S. Henton
ATTORNEY

INVENTORS
JOSEPH PERKS
WILLIAM HENRY BISHOP
by Walter S. Pleston
ATTORNEY

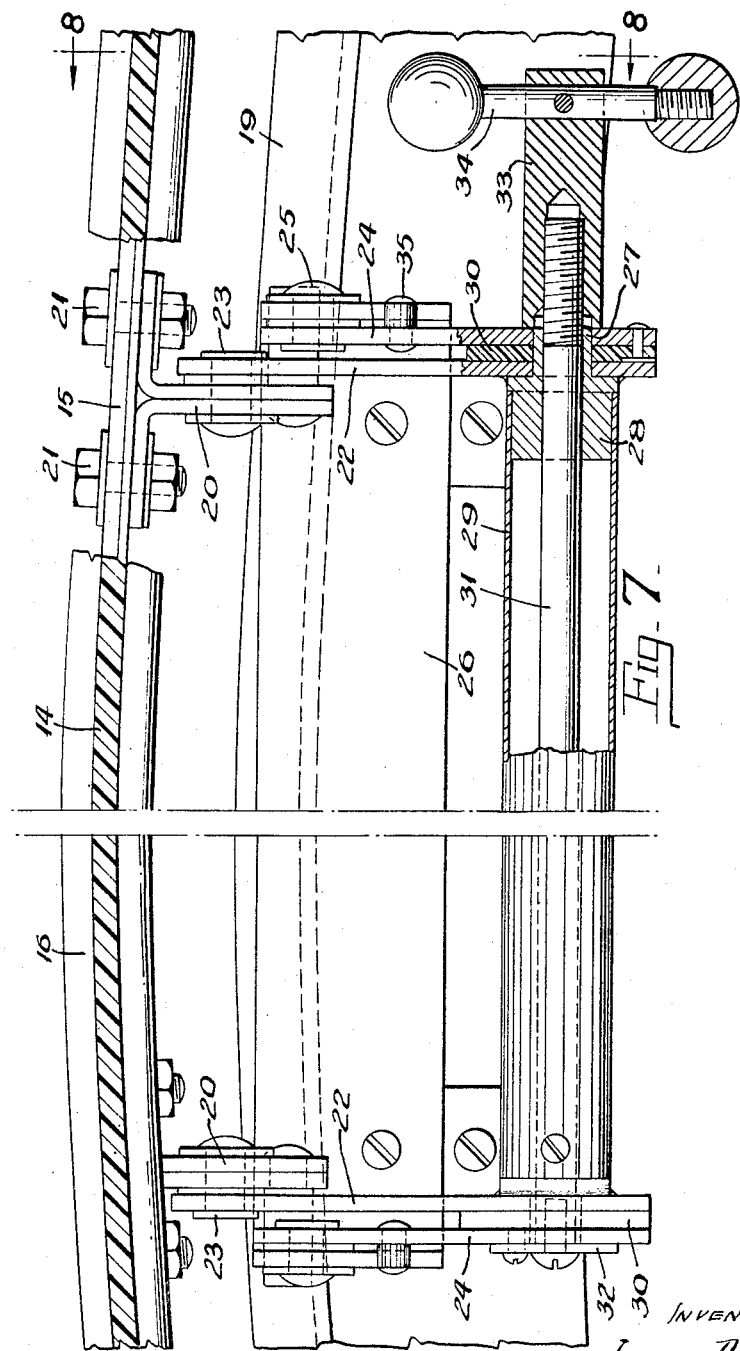

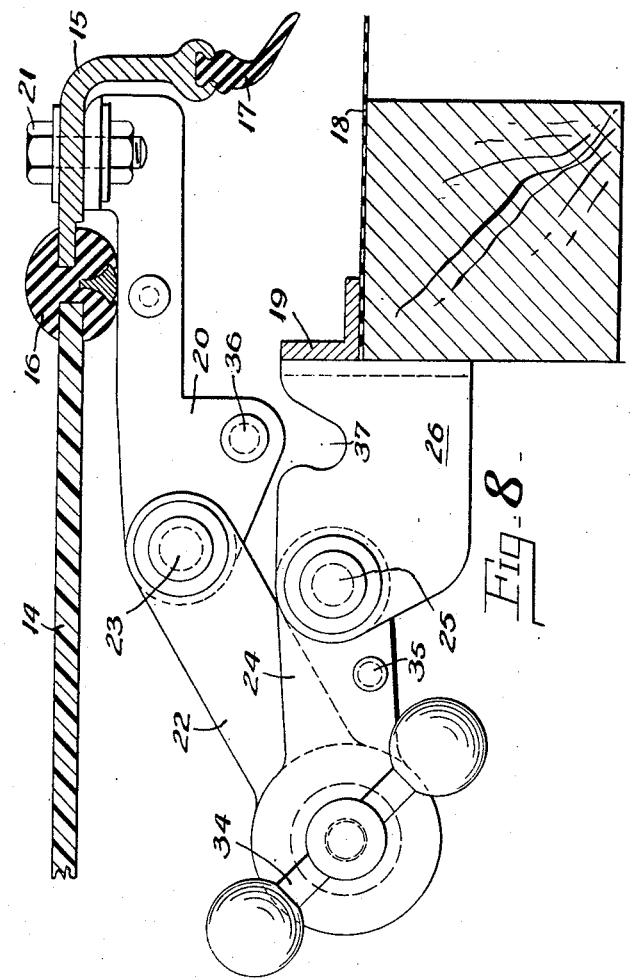

United States Patent Office 2,810,334
Patented Oct. 22, 1957

2,810,334

ROOF VENTILATORS FOR MOTOR COACHES AND LIKE VEHICLES

Joseph Perks, Warstock, Birmingham, and William Henry Bishop, Harborne, Birmingham, England, assignors to Weathershields Limited, Birmingham, England, a British company Application November 16, 1954, Serial No. 469,252

Claims priority, application Great Britain November 26, 1953

3 Claims. (Cl. 98—9)

This invention relates to improvements in roof ventilators for motor coaches and like vehicles.

One known form of ventilator comprises a panel fitting over a rectangular opening in the vehicle roof, the panel being hinged at its front edge and being provided at its rear edge with means whereby that edge can be raised to bring the panel into an inclined position to provide ventilation. The panel may be opaque or it may be a frame carrying a transparent panel of glass or plastic.

According to our invention a roof ventilator for a motor coach or like vehicle adapted to cover an opening in the roof is coupled at its front and rear ends to the roof by linkage of such a form that each end of the ventilator can be raised while the ventilator hinges about the other end which is positively located to prevent any movement of that end other than a purely angular movement.

Thus the front edge of the ventilator can be raised so that when the vehicle is in motion fresh air will be directed into the vehicle, or the rear edge can be raised so that the ventilator acts as an extractor ventilator withdrawing vitiated air from the vehicle.

The linkage is preferably so arranged that both front and rear edges of the ventilator can be raised simultaneously or successively to bring the ventilator into a position above and parallel to the roof, means being provided to lock the ventilator rigidly in that position and prevent any fore and aft movement of the ventilator under acceleration and deceleration forces.

The ventilator conveniently comprises a skeleton metal frame in which is mounted a panel which may be made of sheet metal, plywood, or other opaque material, or it may be made of transparent or translucent plastic to provide overhead lighting.

In the closed position the ventilator is arranged to fit down over an upstanding lip or flange which extends round the opening in the roof and prevents the entry of water into the opening, and the peripheral edge of the ventilator frame may carry a downwardly projecting rubber or other flexible sealing strip adapted to bear against the surface of the roof around the opening when the ventilator is closed.

One practical form of roof ventilator in accordance with our invention is illustrated by way of example in the accompanying drawings in which:

Figure 7 is an elevation in part section looking from the inside of the mechanism for raising and lowering one end of the ventilator, the ventilator being partially raised from the closed position.

Figure 8 is a fragmentary section on the line 8—8 of Figure 7.

Figure 1:
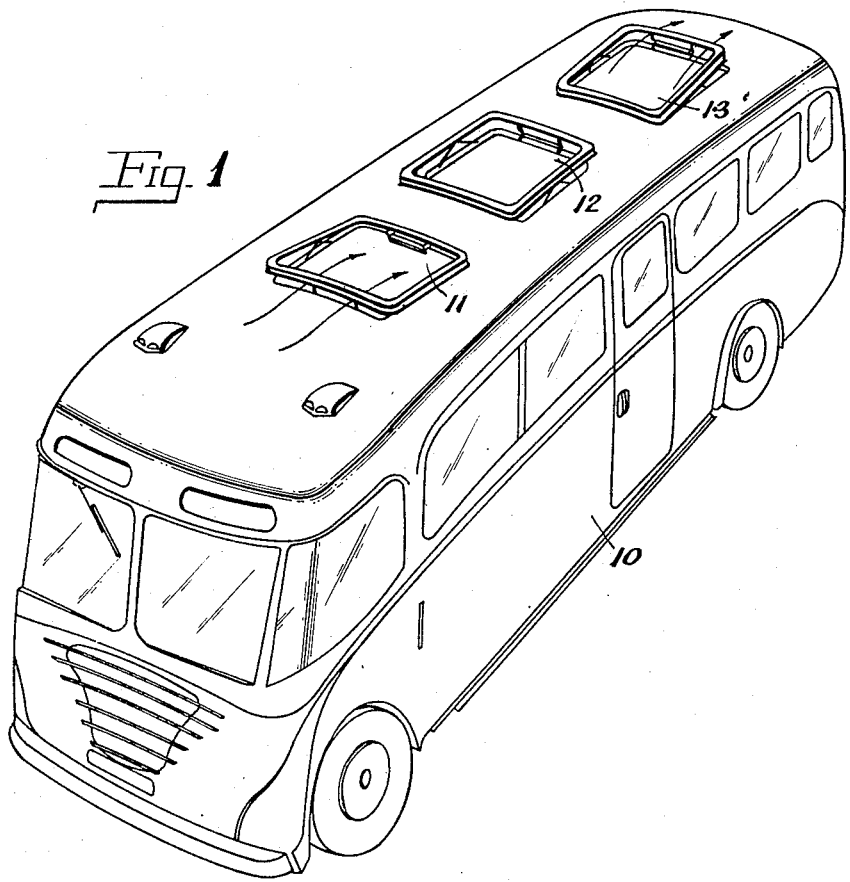
Figure 1 is a perspective view of a motor coach having three of the improved ventilators mounted in the roof, the three ventilators being shown in three different open positions.

In Figure 1, 10 is a single-deck motor coach in the roof of which three identical ventilators 11, 12, 13 in accordance with our invention are mounted in line.

Each ventilator fits over a rectangular opening in the roof and has three possible open positions. The front ventilator 11 is shown with its front edge raised so that when the vehicle is in motion fresh air will be directed into the vehicle. The central ventilator 12 is shown in its fully raised position in which it lies above and parallel to the roof and air can flow below it and can pass into and out of the vehicle whether the vehicle is moving or stationary.

The rear ventilator 13 is shown with its rear edge raised so that it acts as an extractor ventilator drawing vitiated air from the vehicle.

It will be appreciated that each of the ventilators can be set in any of the open positions shown.

Figure 5:
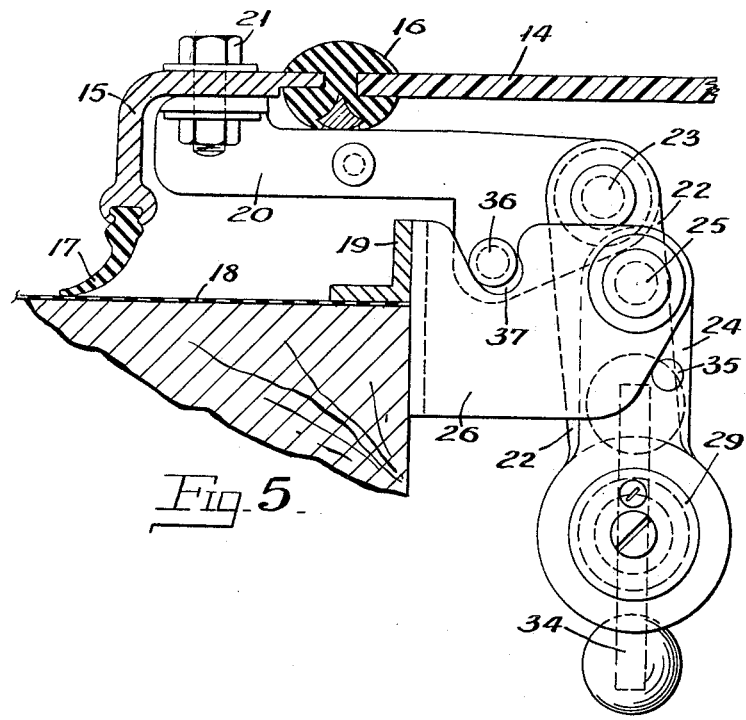
Figure 5 is a fragmentary section on the line 5—5 of Figure 3.
Figure 6:
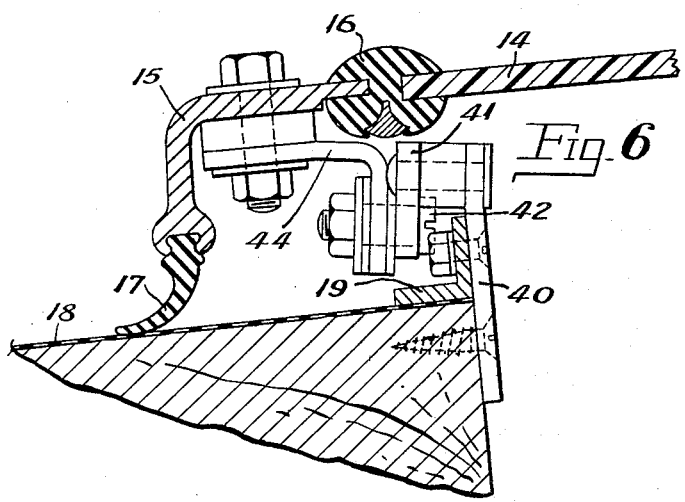
Figure 6 is a fragmentary section on the line 6—6 of Figure 3.

Referring now to the constructional details of the ventilator as shown in the other figures of the drawings, the ventilator comprises a panel 14 mounted in a skeleton rectangular metal frame 15. The panel may be of metal or plywood but is preferably of transparent or translucent plastic which may be tinted. For mounting the panel in the frame its edge is received in a groove in the inner face of a rubber moulding 16, and the inner edge of the frame 15 is received in a groove in the outer face of the moulding. The frame is of angle section, as shown more particularly in Figures 5, 6 and 8, and is preferably extruded in light alloy. The lower edge of the vertical flange of the frame is spaced from the vehicle roof and is recessed to receive a flexible rubber sealing strip 17 which is urged against the surface of the roof 18 in the closed position of the ventilator as shown in Figures 5 and 6. The spacing of the lower edge of the frame from the roof allows for the small downward movement of the end member of the frame at one end when the other end is raised, while the rubber strip 17 maintains a seal between the frame and the roof at the end which is not raised.

The internal dimensions of the ventilator frame are slightly greater than those of the roof opening and in the closed position the ventilator overlies an upstanding flange 19 which is fixed to the roof around the opening and prevents water from being blown along the surface of the roof into the opening when the ventilator is open.

At each end of the ventilator there are mounted on the underside of the frame two spaced parallel inwardly extending brackets 20 rigidly secured to the frame by bolts 21. Links 22 pivotally mounted at 23 on the inner ends of the brackets 20 are pivotally connected at their free ends to the free ends of links 24 which are pivotally mounted at 25 on cranked flanges at opposite ends of a bracket 26 secured to the wall of the roof opening.

The pivotal connections between the links 22 and 24 are formed by spigot portions 27 on plugs 28 secured in the ends of a cylindrical tubular bar 29 forming a handle and extending horizontally between the two pairs of links, the plugs being brazed or otherwise secured to the inner faces of the links 22 and the spigot portions being a working fit in openings in the links 24. Discs 30 of fibre or other friction material are located on the spigots 27 between each pair of links, and a rod 31 extends axially through the spigots and handle. One end of the rod is fixed in a plate 32 secured to one of the links 22 and the other end of the rod extends through the other link 22 and is screw-threaded to receive a nut 33 provided with a finger-piece 34 for rotating it. Thus by tightening the nut 33 the pivotal connections between the links of each pair are frictionally clamped to hold the links in different relative angular positions.

Figure 4:
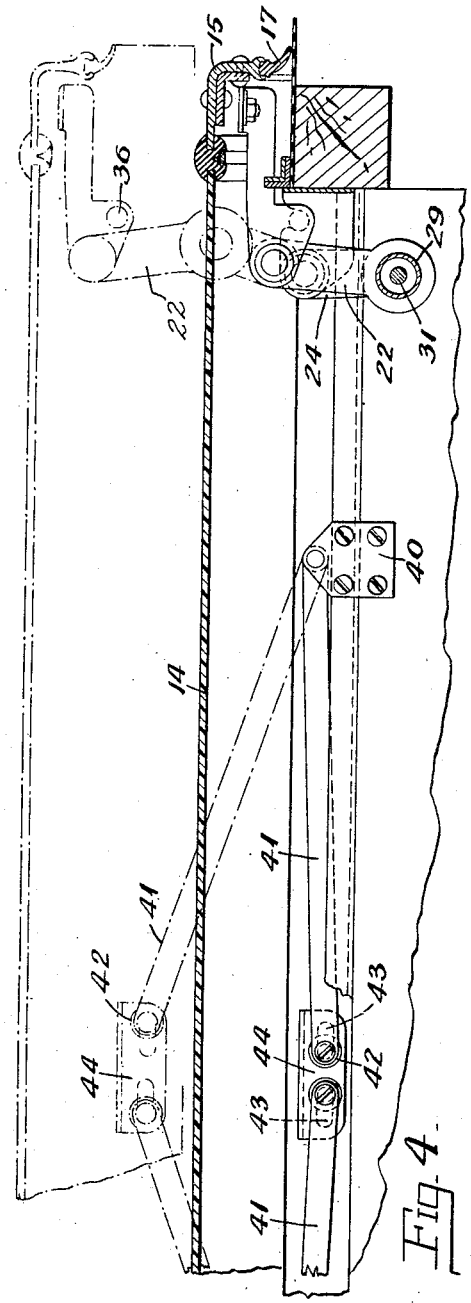
Figure 4 is a fragmentary section on the line 4—4 of Figure 3.

Each pair of links 22 and 24 forms a toggle, and in the closed position of the ventilator, as shown in Figure 5 and in full lines in Figure 4, both links extend substantially vertically downwards from their pivots, and a peg 35 on the link 24 engaging the end of the bracket 26 locates the links in such a position that a plane containing the pivotal axis 23 of the link 22 and the axis of the bar 29 forming the handle lies closer to the end of the opening in the roof than the axis 25 about which the link 24 pivots on the bracket 26 so that the toggle formed by the links is locked.

In this position the ventilator is locked against fore-and-aft movement by the engagement of pegs 36 on the brackets 20 with notches 37 in the brackets 26.

To release and raise either end of the ventilator the appropriate bar handle 29 is grasped and drawn away from the adjacent end of the opening to break the toggle formed by the links and then is swung upwardly through an angle of rather more than 180° so that the links 24 extend upwardly from their fixed pivots on the brackets 26 and the links 22 extend upwardly from the bar handle as shown in dotted lines in Figure 4. A stop for the linkage in this position is formed by the engagement of the links 22 with the pegs 36 on the brackets 20.

At the other end the ventilator simply moves angularly about the link pivots 23 as a hinge, any fore-and-aft movement of this end of the ventilator being prevented by the engagement of the pegs 36 in the notches 37 which are of sufficient depth to allow for the small angular movement of the ventilator as the other end is raised.

If it is desired to open either end of the ventilator to an extent less than the full amount shown in dotted lines in Figure 4 the bar handle is moved through the desired angle and then the pivotal connection between the links is locked by tightening the nut 33 by means of the finger-piece 34. Figures 7 and 8 show one end of the ventilator in a partially open position.

Figure 2:
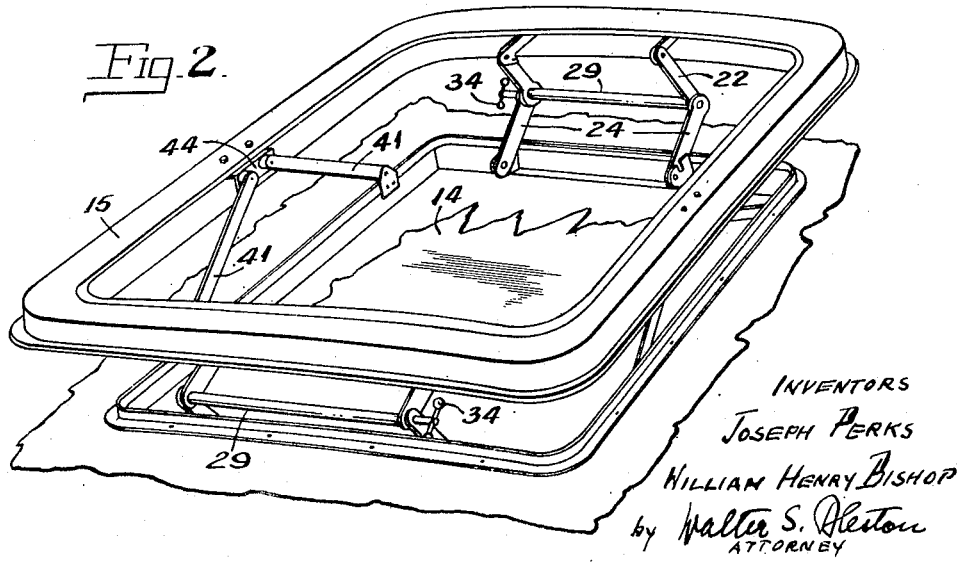
Figure 2 is a perspective view of a ventilator in the fully open position in which it is parallel to the surface of the roof.
Figure 3:
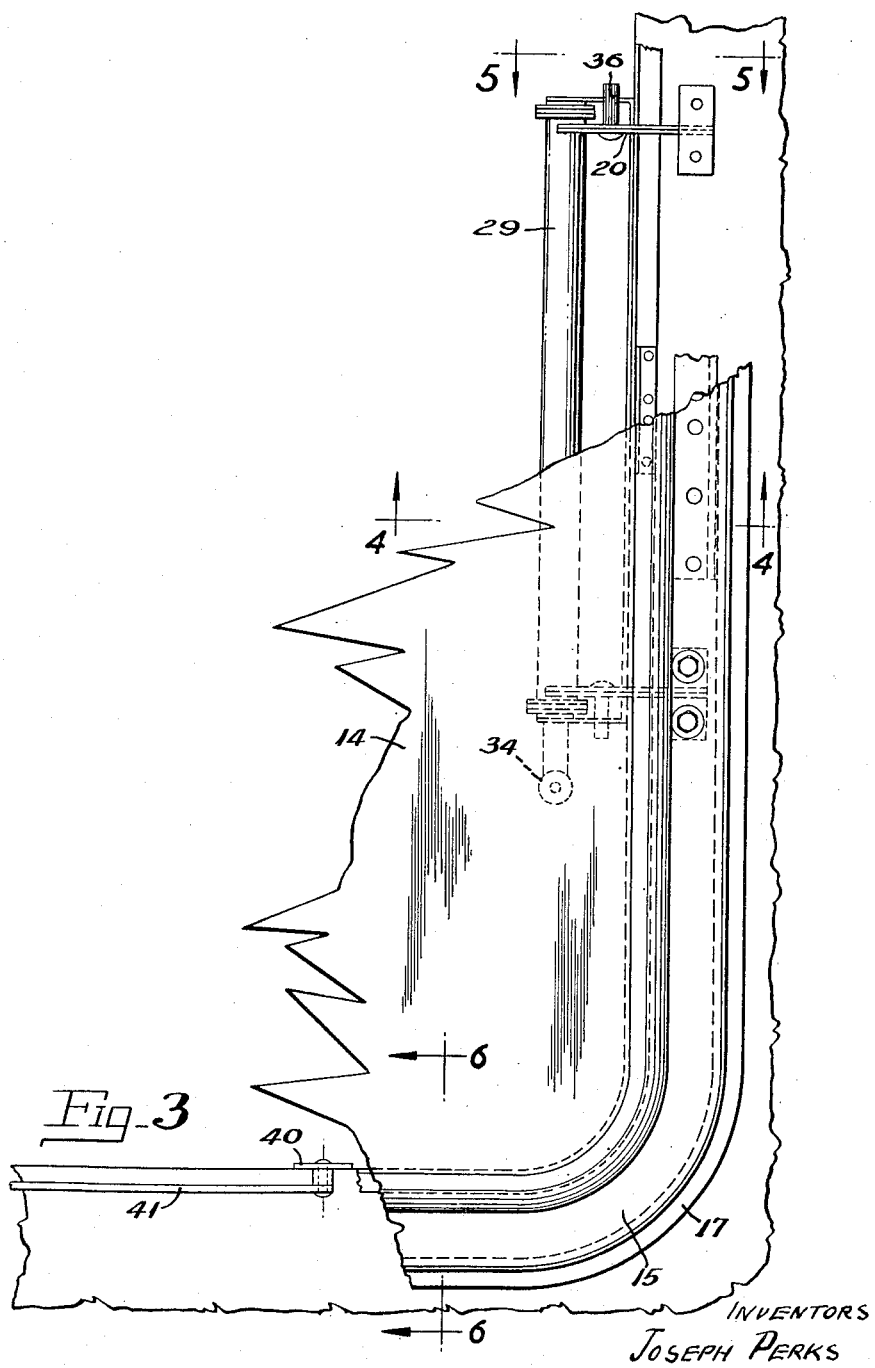
Figure 3 is a fragmentary plan, partly broken away, of one corner of the ventilator.

To open both ends of the ventilator to bring the ventilator bodily into the raised position shown in Figure 2 the two ends of the ventilator are raised simultaneously or successively by means of the bar handles.

To locate the ventilator against fore-and-after movement when in this position the means shown in Figures 2, 4 and 6 are employed. Two brackets 40 are mounted on one or each side of the roof opening at equal distances from the front and rear ends. Oppositely inclined stays or links 41 are pivoted at one end to the brackets 40 and their other ends are pivoted to members 42 slidable in aligned slots 43 of limited length in a vertical flange of a cranked bracket 44 secured to and projecting downwardly from the side member of the frame 15. The length of the slots 43 and of the links 41 is such that when the ventilator has been fully raised the sliding members 42 abut against the outer ends of the slots as shown in dotted lines in Figure 4 so that the stays effectively locate the panel against any longitudinal movement in either direction. At the same time the links do not affect the movement of the ventilator when it is raised at one end only. In the closed position of the ventilator the links 41 lie between the downwardly extending flange of the ventilator frame and the upstanding flange 19 around the opening so that their presence is not obvious.

Where the roof of the vehicle is flat the ventilator frame and panel will be flat but where the roof is transversely curved, as is usual, the ventilator will be curved transversely to the same radius as the roof as in the example illustrated.

We claim:

1. A roof ventilator for a motor vehicle comprising a frame enclosing an opening in the roof, a rigid ventilator panel adapted to fit over said opening, spaced first brackets fixed to each end of said ventilator panel, spaced second brackets fixed to the adjacent end of the frame below said first brackets, said second brackets having portions extending inwardly of the frame and said portions having upper edges, and pairs of toggle links pivotally connected to said first and second brackets and to each other, said links being movable between two extreme positions in one of which they extend substantially vertically downwards from the brackets to hold the ventilator panel closed and in the other of which they extend upwardly from said second brackets substantially in alignment with each other to hold the end of the ventilator panel raised clear of the roof, the link pivots passing over center as they move between said extreme positions, pegs extending laterally from said first brackets, the upper edges of said second brackets being provided with notches associated with said pegs, said pegs and associated notches being so disposed that, when the corresponding end of the panel is closed and the associated links extend substantially vertically downwards each peg engages its associated notch and locates that end of the panel against longitudinal movement.

2. A roof ventilator for a motor vehicle comprising a frame enclosing an opening in the roof, a rigid ventilator panel adapted to fit over said opening, spaced first brackets fixed to each end of said ventilator panel, spaced second brackets fixed to the adjacent end of the frame below said first brackets, and pairs of toggle links pivotally connected to said first and second brackets and to each other, said links being movable between two extreme positions in one of which they extend substantially vertically downwards in an over-center position from the brackets to hold the ventilator panel closed and in the other of which they extend upwardly from said second brackets substantially in alignment with each other to hold the end of the ventilator panel raised clear of the roof, the link pivots passing over center as they move between said extreme positions, and means acting directly between said first and second brackets for locating each of said first brackets longitudinally with respect to its associated second bracket when the corresponding end of the panel is closed.

3. A roof ventilator for a motor vehicle as in claim 2, further comprising spaced third brackets mounted on a side of said frame, a plate fixed to and depending from said ventilator panel at the middle of its length, aligned slots of limited length in said plate, members slidable in said slots, and links pivoted at one end to said third brackets and at the other end to said members, said links being oppositely inclined in a raised position of said ventilator panel.

References Cited in the file of this patent

UNITED STATES PATENTS

| 2,159,516 | Ball | May 23, 1939 |
| 2,173,890 | Tuttle | Sept. 26, 1939 |
| 2,177,994 | Person | Oct. 31, 1939 |
| 2,328,659 | McKenna | Sept. 7, 1943 |
| 2,337,632 | Winser | Dec. 28, 1943 |

FOREIGN PATENTS

| 554,764 | Great Britain | July 19, 1943 |